Solomon Shelter.
Plow, Potato Planter & Seeding Machine.
No. 72922
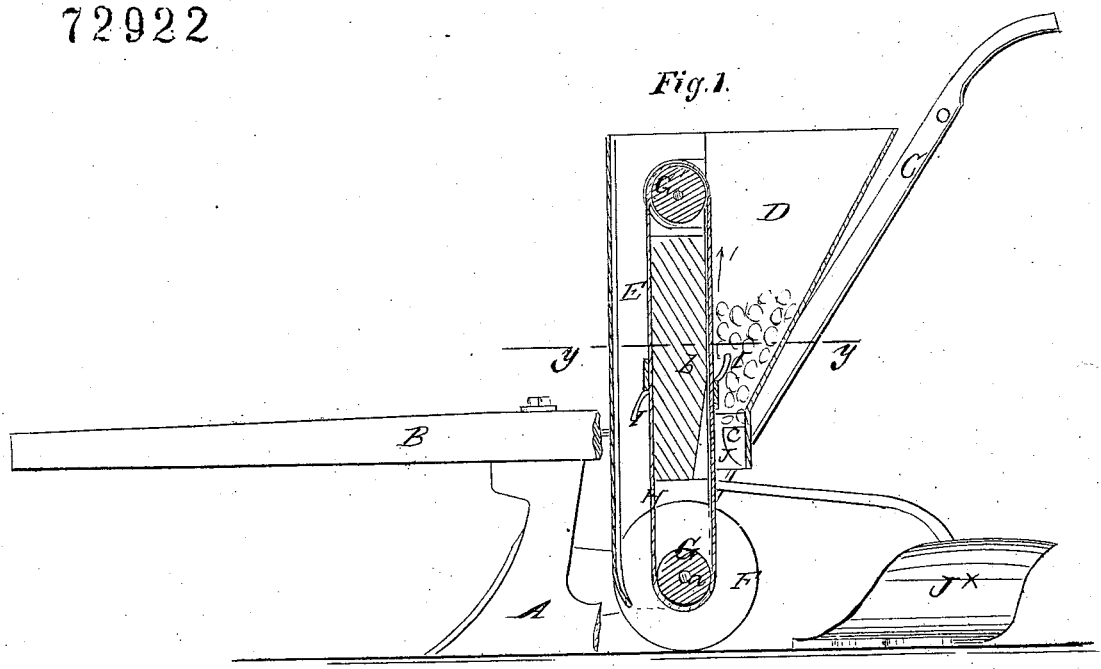
PATENTED DEC 31 1867
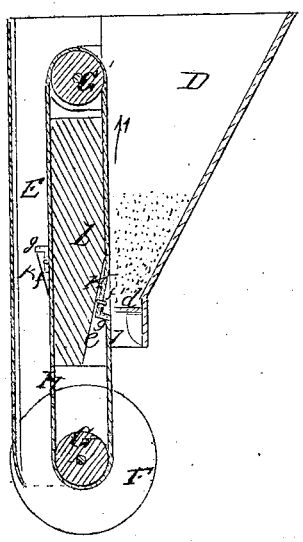
Witnesses
Theo Inseht
N. Trewin
Inventor
S. Shelter
per Munn & Co
Attorneys

United States Patent Office.

SOLOMON SHETTER, OF NEW CUMBERLAND, WEST VIRGINIA.

Letters Patent No. 72,922, dated December 31, 1867.

IMPROVEMENT IN PLOUGHS, POTATO-PLANTERS, AND SEEDERS COMBINED.

The Schedule referred to in these Letters Patent and making part of the same.

TO ALL WHOM IT MAY CONCERN:

Be it known that I, SOLOMON SHETTER, of New Cumberland, in the county of Hancock, and State of West Virginia, have invented a new and improved Plough, Potato-Planter, and Seeding-Machine; and I do hereby declare that the following is a full, clear, and exact description thereof, which will enable others skilled in the art to make and use the same, reference being had to the accompanying drawings, forming part of this specification.

This invention relates to a new and improved combination of a plough, potato-planter, and seeding-machine; and it consists in the employment or use of an endless carrying-apron, operated from a traction-wheel, and arranged and applied in connection with a hopper, plough, and a covering-share, as hereinafter fully shown and described, whereby seed-potatoes and other seed may be planted expeditiously, and in a thorough manner. In the accompanying sheet of drawings—

Figure 1 is a side sectional view of my invention, taken in the line $x\,x$, fig. 3.
Figure 2 is a horizontal section of the same, taken in the line $y\,y$, fig. 1.
Figure 3, a side sectional view of a modification of fig. 1.
Similar letters of reference indicate corresponding parts.

A represents a plough, connected to a beam, B, and handles, C C, in the usual way. These parts being old and well known, do not require a special description, as they comprise the ordinary and well-known plough. D represents a hopper, attached to the beam B, and having a tube or chamber, E, at its front part, which extends upward to the top of the hopper, and projects some distance below its lower end, as shown clearly in figs. 1 and 3. In the lower end of the tube or chamber E the axle $a$ of a wheel, F, is fitted, a pulley, G, being on said axle, and a similar pulley, G', is at the upper end of the partition $b$, which is between the tube or chamber E and the hopper D. On these two pulleys an endless belt, H, is fitted, said belt having forked projections, I, attached, as shown in figs. 1 and 2. At the bottom of the hopper D there is a chamber or box, J, in which there are two lateral projections, $c\,c$. These projections are at such a distance apart that they will admit of the forked projections, I, passing up between them, and at the same time retain the potato-seed (shown in red in fig. 1) in the hopper.

From the above description the operation will be readily seen. As the implement is drawn along, the wheel F will be rotated, and the endless belt H will be moved in the direction indicated by the arrow 1, and the forked projections, I, will carry the seed-potatoes upward and discharge them over the upper end of the partition $b$, and they drop down through the tube or chamber E into the furrow made by the plough A, a covering-share, $J^\times$, at the rear of the plough, covering the potatoes.

In adapting the device for planting seed, buckets, K, are attached to the belt H, as shown in fig. 3, and the box J has a plate, $d$, fitted in it, to hold the seed, a bevel, $e$, at the lower end of partition $b$, admitting of the buckets passing the end of plate $d$, the buckets being formed by attaching metal or wooden side pieces, $f$, and a bottom, $g$, to the belt, and cutting the belt all around the buckets except at their upper ends, so that the cut portion will form the backs of the buckets, the uncut portion forming the attachment and hinges for the buckets.

By this arrangement, seed and grain may be sown or planted equally as well as potatoes.

Having thus described my invention, what I claim as new, and desire to secure by Letters Patent, is—

The endless carrying or distributing-belt H, provided with buckets K, or forked projections I, in combination with the hopper D, tube or chamber E, plough A, and covering-share $J^\times$, all arranged substantially as and for the purpose set forth.

The above specification of my invention signed by me, this 23d day of October, 1867.

SOLOMON SHETTER.

Witnesses:
  JOHN A. PROSSER,
  S. L. BEAUMONT.